United States Patent [19]

Matsumoto et al.

[11] Patent Number: 5,416,248
[45] Date of Patent: May 16, 1995

[54] METHOD OF REMOVING VOLATILE CHLORINATED HYDROCARBON BASE MATERIALS

[75] Inventors: Mamoru Matsumoto, Osaka; Yutaka Morita, Itami; Junji Hayashi, Itami; Takashi Syouji, Itami; Hideo Kawamoto, Itami, all of Japan

[73] Assignees: Mitsubishi Denki Kabushiki Kaisha, Tokyo; Katayama Chemical, Inc., Osaka, both of Japan

[21] Appl. No.: 962,918

[22] Filed: Oct. 19, 1992

[51] Int. Cl.$^6$ ............................................. B09B 3/00
[52] U.S. Cl. ............................... 588/249; 405/128; 405/263
[58] Field of Search ................. 405/128, 263, 266; 210/909, 747, 751, 766; 134/25.1, 26, 40; 588/249

[56] References Cited

U.S. PATENT DOCUMENTS

| | | | |
|---|---|---|---|
| 3,793,841 | 2/1974 | Dozsa | 405/263 |
| 3,875,751 | 4/1975 | Paus | 405/263 |
| 3,929,586 | 12/1975 | Slikkers | 210/751 X |
| 4,018,679 | 4/1977 | Bolsing | 210/751 |
| 4,028,240 | 6/1977 | Manchak | 210/751 X |
| 4,233,015 | 11/1980 | Teague et al. | 405/263 |
| 4,818,390 | 4/1989 | Manchak, Jr. | 210/170 |
| 4,834,194 | 5/1989 | Manchak | 405/263 X |
| 4,913,586 | 4/1990 | Gabbita | 210/751 X |
| 5,018,906 | 5/1991 | Bonier-Sahuc | 405/263 |
| 5,028,272 | 7/1991 | Bonee | 210/751 X |
| 5,080,804 | 1/1992 | Ruff | 210/751 X |
| 5,096,600 | 3/1992 | Hoch | 210/751 |

FOREIGN PATENT DOCUMENTS

| | | | |
|---|---|---|---|
| 0047233 | 3/1982 | European Pat. Off. | C09K 3/32 |
| 4126058 | 2/1993 | Germany | A62D 3/00 |
| 55-003808 | 1/1980 | Japan | B01D 3/00 |

OTHER PUBLICATIONS

Environ. Sci. Technol., vol. 25, No. 5 (1991)
Creaser et al., ". . . Destruction of Polychlorinated Biphenyls by Ruthenium Tetroxide, Chemistry and Industry", pp. 499–500, 1 Aug. 1988.
Boyer et al., "A Mild and Efficient Process for . . . Biphenyls", Tetrahedron Letters, vol. 26, No. 31, pp. 3677–3680, (1985).
Anders W. Andren, "Oxidation of Polychlorinated . . . Hydroxyl Radicals", Environ. Sci. Technol., vol. 25, No. 8, pp. 1419–1427 (1991).
Burkhard et al., ". . . Behavior of Polychlorinated Biphenyls", Abstract, pp. 1703–1716 (1985).
Sediak, D. L., et al. "Interaction of Quicklime with Polychlorobiphenyl-Contaminated Solids", Environ. Sci. Technol., vol. 25, No. 11, Nov. 1991, pp. 1936–1939.
De Percin, P. R., "Demonstration of In Situ Steam and Hot-Air Stripping Technology", The Jouranl of the Air & Waste Management Association, vol. 41, No. 6, Jun. 1991, pp. 873–877.

*Primary Examiner*—Dennis L. Taylor
*Attorney, Agent, or Firm*—Leydig, Voit & Mayer

[57] ABSTRACT

A method of removing volatile chlorinated hydrocarbon base materials contained in soil is provided wherein an inorganic compound that is an oxide of an alkali metal or an alkaline earth metal or a sulfate of an alkaline earth metal, which undergoes an exothermic reaction with water, is mixed in powder or granular form with soil containing a water content of 10% to 30% by weight and volatile chlorinated hydrocarbon base material having a normal boiling point in the range of about 60° to about 120° C., the inorganic compound being mixed with the soil in an amount of 0.01 to 0.5 times the weight of the water content.

13 Claims, No Drawings

METHOD OF REMOVING VOLATILE CHLORINATED HYDROCARBON BASE MATERIALS

FIELD OF THE INVENTION

The present invention relates to a method of removing volatile chlorinated hydrocarbon base materials, and more particularly to a method of removing volatile chlorinated hydrocarbon base materials, such as trichloroethylene, from soil contaminated with those materials.

DESCRIPTION OF THE PRIOR ART

Recently, there has arisen a problem of environmental contamination due to volatile chlorinated hydrocarbon base materials, such as trichloroethylene. It is said that the contamination is caused by degreasing agents used in dry cleaning, washing waste water in the metalworking and electronic industries, and so forth.

Those materials can be thought of as being directly leaked or discharged by accidental situations resulting in being mixed with soil. However, if such materials are left as they are, there is a fear that the materials may further penetrate into soil with natural infiltration, rainwater, etc., contaminate underground water, and eventually impose serious influences upon human health.

Notwithstanding, the actual condition of soil contamination due to volatile chlorinated hydrocarbon base materials has not yet been fully studied at present, and only natural drying by the sun or baking by the use of rotary kilns has been put into practice as a measure to deal with the soil contamination.

Natural drying by the sun cannot completely solve the problem because it depends on weather conditions and has an ability only to remove volatile chlorinated hydrocarbon base materials, which are present in the surface region of soil, even for one week to 10 days or more. On the other hand, baking by the use of rotary kilns is disadvantageous in that it requires great equipment cost and cannot treat a large amount of soil at a time, thus making the treatment operation bothersome.

Further, it is conceivable to recover volatile chlorinated hydrocarbon base materials by using a vacuum pump in consideration of the fact that those materials easily vaporize under low pressure. This method however also has a disadvantage of requiring great equipment cost.

As stated above, no measures have been found so far which are effective in dealing with the soil contamination due to volatile chlorinated hydrocarbon base materials that is responsible for contamination of underground water, and there is a demand for establishing an effective treatment technique quickly.

SUMMARY OF THE INVENTION

In view of the foregoing state of the art, the present invention is able to provide a novel treatment method which can simply and efficiently remove volatile chlorinated hydrocarbon base materials from soil.

According to the present invention, there is provided a method of removing volatile chlorinated hydrocarbon base materials contained in soil, wherein an inorganic compound which undergoes an exothermic reaction with water is mixed with the soil containing volatile chlorinated hydrocarbon base materials.

DETAILED DESCRIPTION OF EMBODIMENT

Volatile chlorinated hydrocarbon base materials to be removed by the present invention are hydrocarbons in which a part or all of the hydrogen atom have been replaced by chlorine atoms and which have a boiling point in the range of about 60° to 120° C. under normal pressure. Examples of those materials are 1,1,1-trichloroethane, trichloroethylene, tetrachloroethylene, chloroform, carbon tetrachloride, ethane dichloride, etc.

An inorganic compound suitably used in the present invention to produce an exothermic reaction with water is selected from oxides of alkali metals or alkaline earth metals and sulfates of alkaline earth metals which include, for example, anthydrides of calcium oxide (quicklime), magnesium oxide, barium oxide, strontium oxide, sodium oxide, potassium oxide, calcium sulfate, and magnesium sulfate. Among them, calcium oxide is preferably used from the standpoints of safety, price and heat generating efficiency. Although commercially available calcium oxide for industrial purposes can be used as the calcium oxide, such calcium oxide as having purity not less than 85%. in terms of CaO is preferable in order to fully develop the effect of the present invention. Further, the inorganic compound used in the present invention is usually suitable to be in the form of powder or granules. Above all, the inorganic compound in the form of granules is more preferable from the standpoint of working efficiency when mixed with soil.

By mixing the above-mentioned inorganic compound with soil containing volatile chlorinated hydrocarbon base materials, the inorganic compound reacts with moisture or water in the soil to generate heat by which the volatile chlorinated hydrocarbon base materials vaporize to be discharged out of the soil.

A particularly remarkable effect is obtained when the soil to be treated has a water content in the range of 10 to 30% (% by weight, this being applied to the following percentage) (note: the water content of the soil is usually within the above range). Therefore, if the water content of the soil is lower than 10%, it is preferable to spray water and agitate the soil before starting the treatment, so that the water content becomes equal to or higher than 10%.

There are no particular limitations in a method of mixing the inorganic compound and the soil. The inorganic compound may be sprinkled onto the soil surface, followed by agitating and mixing the inorganic compound and the soil with each other in that field using mechanical means. As an alternative, calcium oxide may be strewn between masses of soil in the sandwich form. Although the mixing may be even or uneven as illustrated above, the even mixing is more preferable in order to improve the effect of removing the volatile chlorinated hydrocarbon base materials. Depending on cases, the soil may be dug up and moved to another place or into some container suitable for easier even mixing.

A preferable degree of the mixing and a preferable mixing ratio are dependent on the water content of the soil. For the purpose of shortening the time required to remove the volatile chlorinated hydrocarbon base materials and improving the removal efficiency, however, the mixture should be prepared so that the soil temperature during the mixing is held preferably not lower than 15° C., more preferably not lower than 30° C. In a case where the water content of the soil is in the range of 10 to 30%, for example, the intended aim can sufficiently be achieved by mixing the inorganic compound such as calcium oxide in amount by weight 0.01 to 0.5 times, preferably 0.05 to 0.3 times the water content of the soil to be treated.

After mixing the inorganic compound, the soil is preferably subjected to rolling pressure (i.e., compression by the use of physical means) because the rolling pressure enables closer contact of the inorganic compound with water in the soil and accelerates initial heat accumulation, resulting in a shortened rising time of the soil temperature, the promoted effect of retaining the raised temperature, and hence the improved effect of removing the volatile chlorinated hydrocarbon base materials. There are no particular limitations in a method of applying the rolling pressure. For example, the rolling pressure may be applied by moving a roller or the like over the soil so that the soil is physically pressed.

Further, by agitating the soil well at the time the soil temperature reaches a maximum, or around that time, after mixing the inorganic compound, it is possible to shorten the time required to remove the volatile chlorinated hydrocarbon base materials and improve the removal efficiency. Particularly, even when the soil has been solidified to some extent under the rolling pressure, soil grains are comminuted into finer grains by simple agitating operation and the above-mentioned effect due to the agitation is sufficiently developed, for the reason that the water content of the soil is reduced and the soil is brought into an easily crushable state free from viscosity.

Additionally, to prevent contamination of the atmosphere, the volatile chlorinated hydrocarbon base materials discharged from the soil are preferably treated by any suitable method. One conceivable method is to, for example, mix the soil and the inorganic compound under an atmosphere enclosed by a curtain, and adsorb the discharged volatile chlorinated hydrocarbon base materials by an adsorbent such as activated charcoal.

With the present invention as explained above, the content of the volatile chlorinated hydrocarbon base materials in the soil can be reduced down below 0.01 mg/kg by simple operation.

Next, the present invention will be described in more detail in conjunction with the following examples and comparative examples.

EXAMPLES 1–7 AND COMPARATIVE EXAMPLE 1

Soil of about 10 kg contaminated with trichloroethylene was put in a synthetic resin container with dimensions of 250 mm width×370 mm length×120 mm height, and quicklime (CaO, purity not less than 90%) comminuted into mean grain size of 5 mm was sprinkled in a predetermined amount on the soil and well mixed therewith. The mixture was then agitated during the treatment time under agitating conditions shown in Table 1. As to Examples 5 to 7, the mixture was subjected to rolling pressure by the use of a roller before the agitation. After that, the content of trichloroethylene in the soil was measured. The results are shown in Table 1.

Method of Measuring Content of Trichloroethylene

Soil of 5 g was quickly weighed and sampled into a centrifugal settling tube of 50 ml. Water of 10 ml and n-hexane of 10 ml were quickly added into the tube. After fitting a cap, the mixture was shaken for 10 minutes by using a shaker for extraction. The n-hexane layer was then introduced to a gas chromatograph and subjected to quantitative analysis. In this step, the water content of the soil was simultaneously measured and the content of trichloroethylene with respect to the total soil in dry measure was determined (in conformity with the measuring method described in "Environment And Measuring Techniques", Vol. 16, No. 5, 1989, pp. 31–34, Environmental Measurement and Analysis Association of Japan (Corporation).

TABLE 1

| Example No. | Sample soil | | | Amount of quicklime sprinkled (percentage to soil) | Presence of rolling pressure | Agitating condition | Treatment time (Hr) | Soil temp. (°C.) | TCE Concentration* after treatment (mg/kg) | Removal ratio** (%) |
| --- | --- | --- | --- | --- | --- | --- | --- | --- | --- | --- |
| | TCE concentration* (mg/kg) | Soil Temp. (°C.) | Water content (%) | | | | | | | |
| 1 | 16 | 12–14 | 15 | 1 | None | Agitate for 5 min. by shovel every 5 hrs. | 20 | 14–18 | 3 | 81.3 |
| 2 | 16 | 12–14 | 15 | 2 | None | Agitate for 5 min. by shovel every 5 hrs. | 20 | 16–20 | 0.6 | 95.0 |
| 3 | 16 | 12–14 | 15 | 3 | None | Agitate for 5 min. by shovel every 5 hrs. | 20 | 24–25 | 0.1 | 99.4 |
| 4 | 16 | 13–14 | 15 | 4 | None | Agitate for 5 min. by shovel every 5 hrs. | 20 | 30–37 | 0.01 or less | 99.9 |
| 5 | 16 | 12–14 | 16 | 3 | Yes | Agitate for 5 min. by shovel every 5 hrs. | 20 | 30–37 | 0.01 or less | 99.9 |
| 6 | 16 | 13–14 | 20 | 2 | Yes | Agitate for 5 min. by shovel every 5 hrs. | 20 | 28–35 | 0.05 | 99.7 |
| 7 | 16 | 12–14 | 15 | 3 | Yes | Agitate for 5 min. by shovel every 5 hrs. | 15 | 28–35 | 0.01 or less | 99.9 |
| Comparative Example 1 | | 12–14 | 15 | 0 | None | Agitate for 5 min. by shovel every 5 hrs. | 20 | 12–14 | 10 | 37.5 |

*Concentration of trichloroethylene
**(A − B)/A × 100
A: TCE concentration (mg/kg),
B: TCE concentration (mg/kg) after treatment

EXAMPLE 8

Dug soil with trichloroethylene content of 8.3 mg/kg and a water content of 18.0% was transported to a vinyl plastic house and leveled to dimensions of 1 m×1 m×0.2 m thickness. The soil temperature after the leveling was 11° C. Quicklime (CaO, purity not less than 90%) was evenly sprinkled over the soil surface so that the percentage of quicklime with respect to the total soil weight became 4%. The mixture was then agitated and mixed by using a shovel. After the mixing, the mixture was quickly subjected to rolling pressure by the use of a roller. After that, while confirming a temperature rise, agitation by using a shovel was started at the time the soil reached an allowable maximum temperature. While keeping mixture intact for 10 hours, similar agitation was carried out two times with equal intervals. The temperature change during the above period was in the range of 25° to 32° C. The content of trichloroethylene after 10 hours was 0.9 mg/kg. While keeping the mixture intact for another 10 hours, similar agitation was carried out two times with equal intervals, The temperature change during the above another period was in the range of 23° to 29° C. The content of trichloroethylene after the final 10 hours was 0.01 mg/kg. The water content of the soil at that time was 13.8%. With the agitation, the solidified soil was so crushed as to bring about a soil state of even fine grains.

COMPARATIVE EXAMPLE 2

Soil sampled and leveled similarly to Example 3 was dried by the sun in a vinyl plastic house. The content of trichloroethylene was 6 mg/kg after carrying out the agitation in a like manner to Example 8 while keeping the mixture intact for 10 hours. Total 336 hours was required to make the content of trichloroethylene below 0.01 mg/kg by repeating the agitation in a like manner.

EXAMPLE 9

In Example 8, a discharged gas processing unit (processing capability; 3 m³/minute) having a power filled with granular activated charcoal was additionally provided to a vinyl plastic house with a capacity of 12 m³.

While the content of trichloroethylene, in air, discharged into the vinyl plastic house was varied in the range of 1 to 6 ppm during the soil treatment time (about 20 hours), the trichloroethylene density was never higher than 1 ppm at the outlet of the discharged gas processing unit and an effect of preventing air pollution was obtained.

As described above, the present invention can offer an advantage that from soil containing volatile chlorinated hydrocarbon base materials such as trichloroethylene, those materials can be removed by simple operation, in a shorter period of time and in a high yield at low cost. Consequently, the present invention can provide a superior technique for treating contaminated soil that is responsible for contamination of underground water, and hence contribute to prevention of environmental pollution.

What is claimed is:

1. A method of removing volatile chlorinated hydrocarbon base materials contained in soil, wherein an inorganic compound that is an oxide of an alkali metal or an alkaline earth metal or a sulfate of an alkaline earth metal which undergoes an exothermic reaction with water is mixed in powder or granular form with soil containing a water content of 10% to 30% by weight and volatile chlorinated hydrocarbon base material having a normal boiling point in the range of about 60° to about 120° C., said inorganic compound being mixed with said soil in an amount of 0.01 to 0.5 times the weight of the water content and said soil being subjected to rolling pressure and subsequent agitation after mixing with said inorganic compound.

2. A method according to claim 1, wherein said volatile chlorinated hydrocarbon base materials discharged from said soil are adsorbed by an adsorbent after said inorganic compound has been mixed with said soil.

3. A method according to claim 1, wherein when the water content of said soil is less than about 10%, water is sprayed onto said soil and said soil is agitated before starting the treatment, so that the water content becomes not less than about 10%.

4. A method according to claim 1, wherein said volatile chlorinated hydrocarbon base materials are hydrocarbons in which some or all of the hydrogen atoms are replaced by chlorine atoms and which have a boiling point in the range of about 60° to 120° C. under normal pressure.

5. A method according to claim 4, wherein said volatile chlorinated hydrocarbon base materials are selected from the group consisting of 1,1,1-trichloroethane, trichloroethylene, tetrachloroethylene, chloroform, carbon tetrachloride, and ethane dichloride.

6. A method according to claim 1, wherein said inorganic compound is an anthydride selected from the group consisting of sodium oxide, potassium oxide, magnesium oxide, calcium oxide, strontium oxide, and barium oxide.

7. A method according to claim 1, wherein said inorganic compound is an anthydride of magnesium sulfate or calcium sulfate.

8. A method according to claim 1, wherein said inorganic compound is mixed with said soil in amount by weight 0.05 to 0.3 times as much as the water content of said soil.

9. A method according to claim 1 wherein the inorganic compound in powder or granular form has an average particle size of about 5 mm.

10. A method according to claim 1 wherein mixing of said inorganic compound with water present in the soil at the time said inorganic compound is added generates heat sufficient to vaporize said volatile chlorinated base materials and cause them to be discharged from the soil.

11. A method of removing volatile chlorinated hydrocarbon base materials contained in soil, wherein an inorganic compound that is an oxide of an alkali metal or an alkaline earth metal or a sulfate of an alkaline earth metal which undergoes an exothermic reaction with water is mixed in powder or granular form with soil containing a water content of 10% to 30% by weight and volatile chlorinated hydrocarbon base material having a normal boiling point in the range of about 60° to about 120° C., said inorganic compound being mixed with said soil in an amount of 0.01 to 0.5 times the weight of the water content.

12. A method according to claim 11, wherein said soil is subjected to rolling pressure after said inorganic compound has been mixed therewith.

13. A method according to claim 11, wherein said soil is subjected to agitation after said inorganic compound has been mixed therewith.

* * * * *